United States Patent
Harsch et al.

(10) Patent No.: US 6,715,981 B1
(45) Date of Patent: Apr. 6, 2004

(54) TRANSPORT SYSTEM

(75) Inventors: Erich Harsch, Weingarten (DE); Rainer Reichenbach, Schlier (DE)

(73) Assignee: Müller Weingarten AG, Weingarten (DE)

(*) Notice: Subject to any disclaimer, the term of this patent is extended or adjusted under 35 U.S.C. 154(b) by 0 days.

(21) Appl. No.: 09/936,327

(22) PCT Filed: Mar. 2, 2000

(86) PCT No.: PCT/DE00/00651
§ 371 (c)(1), (2), (4) Date: Sep. 13, 2001

(87) PCT Pub. No.: WO00/54904
PCT Pub. Date: Sep. 21, 2000

(30) Foreign Application Priority Data

Mar. 17, 1999 (DE) .......................................... 199 11 796

(51) Int. Cl.[7] .............................................. B65G 35/00
(52) U.S. Cl. ........................................ 414/752.1; 901/6
(58) Field of Search ............................... 414/735, 749.1, 414/752.1; 901/16, 21, 6; 198/861.1, 468.2

(56) References Cited

U.S. PATENT DOCUMENTS

| | | | |
|---|---|---|---|
| 4,589,819 A | | 5/1986 | Shirao |
| 5,222,854 A | * | 6/1993 | Blatt et al. ........... 414/752.1 X |
| 5,452,981 A | | 9/1995 | Crorey et al. |

FOREIGN PATENT DOCUMENTS

| | | |
|---|---|---|
| DE | 30 40 655 | 5/1982 |
| DE | 196 54 475 | 7/1998 |
| EP | 0 658 403 | 6/1995 |
| EP | 0 672 480 | 9/1995 |
| GB | 2 086 285 | 5/1982 |

* cited by examiner

*Primary Examiner*—Donald W. Underwood
(74) *Attorney, Agent, or Firm*—Venable LLP; Robert Kinberg (57) ABSTRACT

A transport system provided in particular for large-component transfer presses is distinguished by a design with a low width and, nevertheless, permits large transport steps. By controlling two drives in the direction of rotation in relation to each other, all desired travel curves in one plane can be realized. As a result of the simple construction, a cost-effective solution is achieved for a highly dynamic transport system.

16 Claims, 7 Drawing Sheets

TRANSPORT SYSTEM

BACKGROUND OF THE INVENTION

1. Field of the Invention

The invention relates to a transport system for transporting workpieces from a machining station into the next machining station in a press, press line, or the like.

2. Related Art

Where the manufacture of a workpiece calls for a plurality of work operations, for the economic production of the sheet-metal part, the necessary individual operations are carried out in a transfer press or press line, as they are known. The number of dies then correspond to the number of work stages which are necessary for the manufacture. Transfer presses of this type have a transport device with which the workpieces are transported onward from one workstation to the next.

As a rule, such transport devices are nowadays equipped with loadbearing rails which extend through the entire length of the shaping machine. In order to transport the components, the loadbearing rails are fitted with gripper or holding elements. In this case, a distinction is made, depending on the movement sequence, between a two-axis transfer fitted with suction crossmembers or a three-axis transfer provided with gripper elements. As an additional movement, pivoting in order to change the attitude of the component during the transport step may also be required.

The transfer movement is initiated via cams, which are forcibly synchronized with the ram drive via movement transmission elements. The manufacture or large-area components, in particular, has led to the development of large-component transfer presses of greater and greater dimensions, based on the shaping force and the transport paths. Die spacings of the order of magnitude of 3000 mm are entirely normal nowadays, and therefore corresponding transport steps are also necessary.

As a result of this development, the masses to be accelerated and braked in the transfer systems are completely opposed to the low masses of the components to be transported.

A further disadvantage is the rigid movement sequence which is predefined by the cam drives. In the event of a changeover to a new workpiece, it would generally also be necessary for the transfer cams to be adapted.

In order to avoid these indicated disadvantages, intellectual rights applications nowadays concern the replacement of the previous transfer system by a corresponding number of transfer systems arranged between the machining stages and equipped with their own drive. Such an arrangement is disclosed by EP 0 672 480 B1. Transfer systems arranged on the uprights are equipped with a number of drives which, in operative connection with the movement transmission means, carry out the transport of the components. As a special feature, the system can be re-equipped both as a two-axis transfer with suction beams and as a three-axis transfer with grippers. However, this universal use requires a corresponding outlay on construction.

Likewise arranged in each upright area is a transfer device disclosed by DE 196 544 75 A1. In this application, elements which are known as—parallel kinematics—are used for the drive. In a modification of these known movement elements, however, telescopic lengthening of the drive rods is not performed, but, with a constant rod length, the attachment points are changed and therefore the transport movements are achieved. The attachment points that accommodate the forces or torques are not constant in terms of their distance from one another and, in particular when these points are close to one another because of the desired travel curve, support problems can occur. In order to increase the stiffness of the system, further mutually parallel links are also proposed, which are connected to one another by transverse crossmembers. In order to achieve functionally reliable transport of large-area components, the proposed system becomes correspondingly complicated.

U.S. Pat. No. 5,452,981 has disclosed a device for transporting workpieces according to the preamble of claim 1. In this case, the device operates with a threaded spindle, which firstly has a poor efficiency and therefore a not inconsiderable power loss. Furthermore, such drives are sluggish and cannot do justice to a highly dynamic drive mode.

OBJECTS OF THE INVENTION

An object of the invention is based upon the fact that, by using simple measures, of providing a highly flexible and precise transport system which, irrespective of the respective transport attitude, ensures uniformly safe support for the forces and torques which occur.

The invention is based on the idea that, by controlling the rotational speed and direction of rotation of two drives in relation to each other, and in operative connection with movement transmission means, any desired two-axis movements in the horizontal and/or vertical direction are possible. In this case, two highly dynamic drives are controlled by means of simple control operations which influence the direction of rotation and the rotational speed. As a result of superimposing movements in the X and Y axis, this control produces any programmed travel curve in one plane.

If the movement transmission means used is a rack or toothed belt drive, the introduction of the travel curve onto a pivoting or transport arm being carried out via a gear, then the uniform support for the torque is therefore also ensured by the unchangeable gear diameter. The respective movement position does not lead to any kind of change in the effective lever arm relating to the introduction of torque or to the support, and therefore ensures safe and precise component transport.

SUMMARY OF THE INVENTION

The above and other objects are accomplished according to the invention by provision of a transporting device for transporting workpieces in a press. The transporting device can include a pivoting or transport arm, a load-bearing carriage for carrying the pivoting or transport arm that is movable in a longitudinal direction, a drive gear for rotating the pivoting or transporting arm, two racks arranged in parallel for acting jointly on the drive gear, at least two stationary drive motors for driving the two racks, respectively, the drive motors being controllable in direction of rotation, speed of rotation, and stopping for affecting a coordinated movement of the two racks for setting the longitudinal movement of the load-bearing carriage and the rotating of the pivoting or transport arm. In such a transporting device, the rotation direction and speed of rotation coordinate movement of the two racks and the longitudinal movement of the load-bearing carriage and the rotating of the pivoting or transport arm are set.

In a further embodiment, a transporting device for transporting workpieces in a press is provided in which the transporting device includes a pivoting or transport arm, a load-bearing carriage for carrying the pivoting or transport arm that is movable in a longitudinal direction, a drive gear for rotating the pivoting or transporting arm, at least two stationary drive motors for driving the two toothed belt, respectively, the drive motors being controllable in direction of rotation, speed of rotation, and stopping for affecting a coordinated movement of the two toothed belt drives for setting the longitudinal movement of the load-bearing carriage and the rotating of the pivoting or transport arm. In such a transporting device, the rotation direction and steed of rotation coordinate movement of the two racks and the longitudinal movement of the load-bearing carriage and the rotating of the pivoting or transport arm are set.

Depending on the objective, the transport system, in a single design or in a double design, can be fitted in mirror-image fashion in relation to each other, in each case transversely with respect to the press transport direction in the upright area. In the case of use in pairs, the two transport systems are connected, for example by a suction beam carrying the components. Of course, in the case of double-component production, each transport device can also have its own suction beam supported on one side, and the transport systems can be driven independently of each other. Synchronization of the component transport device with the press rail can be carried out with known electronic means, such as the so-called electronic shaft.

Travel curves determined in simulation operation, for example, for the individual transport stages can be configured flexibly, in particular on the basis of the shaping of the components and of the ram position. An advantage which results from this is optimum utilization of the degrees of freedom and, by means of time-offset shaping in the individual press stages, favorable distribution of the press drive power.

If intermediate storage is dispensed with, or for reasons of component transport, pivoting of the suction crossmember can be provided as an additional movement. By means of a simple construction of the transport device proposed, the incorporation of the additional pivoting movement is possible without problems and with only a small change in mass.

The position in which the transport system is added on is variable and may, for example, be carried out above or below the component transport plane. Weight compensation measures, for example by means of the addition of cylinders, both on the actual travel carriage and also on the transport arm lead to the load being relieved on the drives and the movement transmission means. The distance between the shaping stages, predefined by the design structure of the press is not increased by the narrow design of the transport system. On the other hand, in spite of this space-saving design, long transport paths can be executed without problems, with low mass and with great precision.

BRIEF DESCRIPTION OF THE DRAWINGS

Further details and advantages of the invention emerge from the following description of an illustration of the principle and of exemplary embodiments.

In the seven figures.

DETAILED DESCRIPTION OF THE INVENTION

Figure 1:
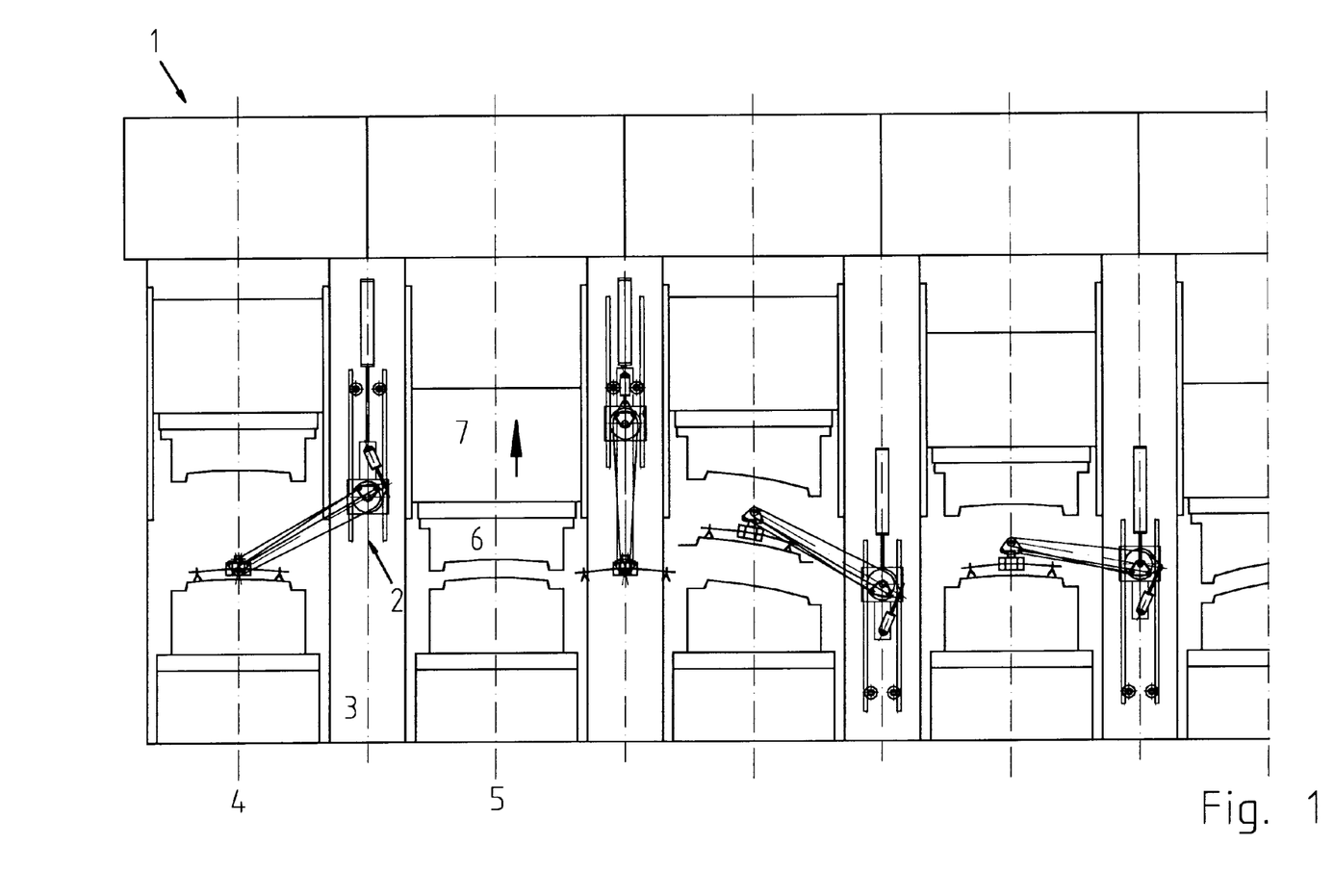
FIG. 1 shows a partial view of a large-component transfer press with transfer devices arranged in the upright area

FIG. 1 shows machining stations or shaping stages in a large-component transfer press 1. The transport device 2 according to the invention is arranged on the press upright 3. As an example, the transport system is mounted both above and below the transport plane. Different transport positions can be seen in a simplified illustration. Thus, in the shaping stage 4, the removal of components takes place, while in the shaping stage 5, the ram 7 carrying the upper part 6 of the die is moving vertically upward after shaping has been carried out. The associated transport system 2 is in its parked position. The action of extending the pivoting or transport arm 13 can be carried out in a very wide range of forms, such as indicated, for example, in EP 0 693 334 A1 of the applicant.

Figure 2:
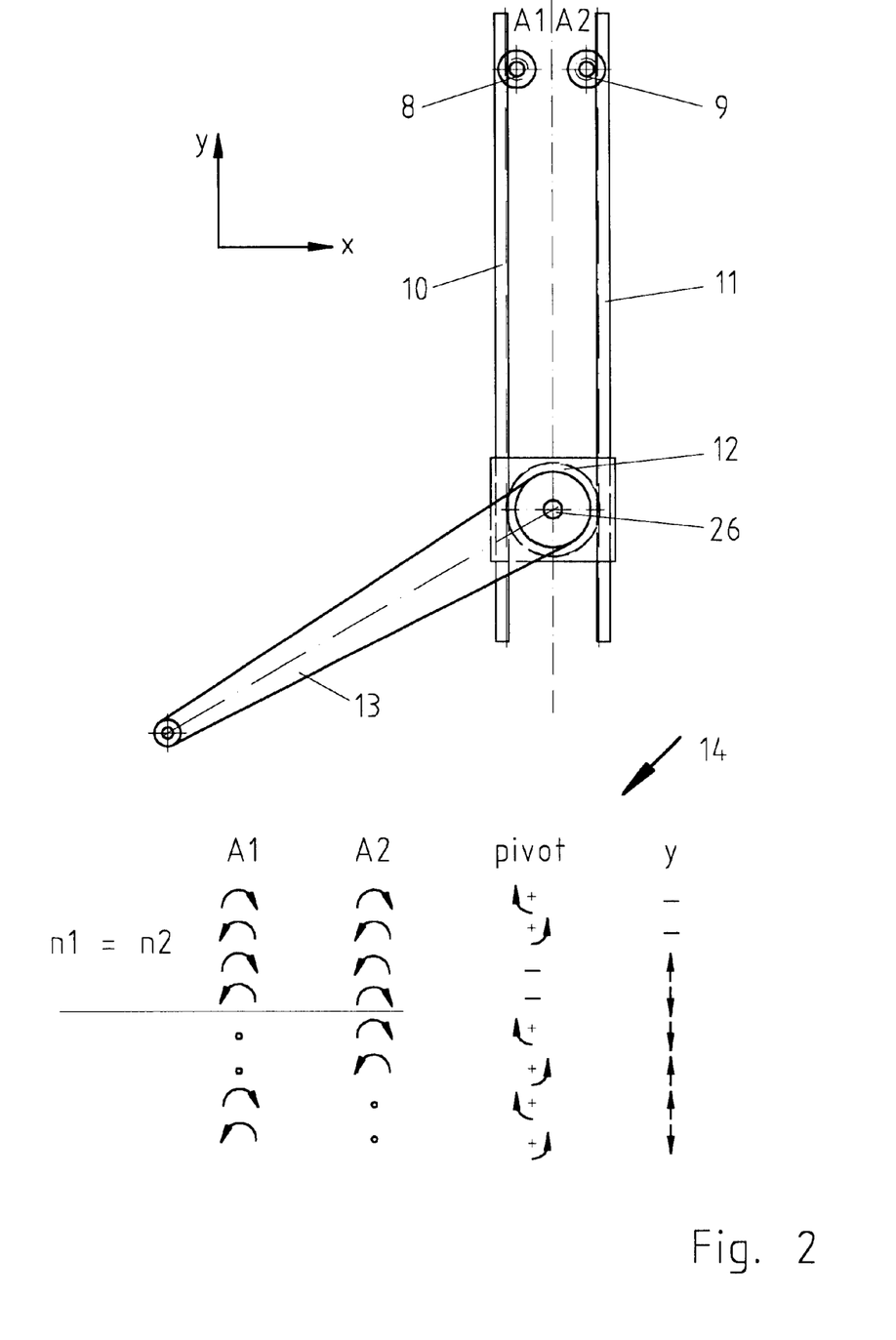
FIG. 2 shows a basic depiction of the transport system with associated movement table

The movement sequences of the transport system can be seen from FIG. 2. The basic depiction shows two drives A1, A2 which set gears 8, 9 moving in rotation or hold them in a rest position. These gears 8, 9 act on racks 10, 11 which, at the instigation of the gear drive, execute a corresponding vertical movement.

The lower part of the racks 10, 11 acts jointly on the gear 12. Connected to this gear 12 is the transport arm 13, with the common center of motion 26. The movement sequences of the transport arm 13 can be seen from the table 14. However, this illustrates only the movements which, when drive is applied, result from identical rotational speeds of the drives A1, A2.

If, for example, both drives A1, A2 rotate clockwise at the same rotational speed, this has the effect, via the drive train (8, 9, 10, 11) of clockwise rotation of the gear 12 and therefore also a pivoting movement directed to the right of the transport arm 13 fixed to the gear 12. In this case, no movement takes place in the vertical (Y) axis. Superimposition of movements, that is to say pivoting and vertical movement, is achieved, for example, by stopping A1 and rotating A2. As can be seen from the table 14, any desired programmable travel curve in one plane can be achieved by means of appropriate rotation or stopping of only the drives A1, A2. Long transport distances can be covered without difficulty with the proposed solution. The identical movement sequences can of course also be achieved with other drive components. If, for example, gears 8, 9 and racks 10, 11 are replaced by separately driven toothed belts with appropriate belt pulleys, then it is possible for exactly the same movements to be made.

Figure 3:
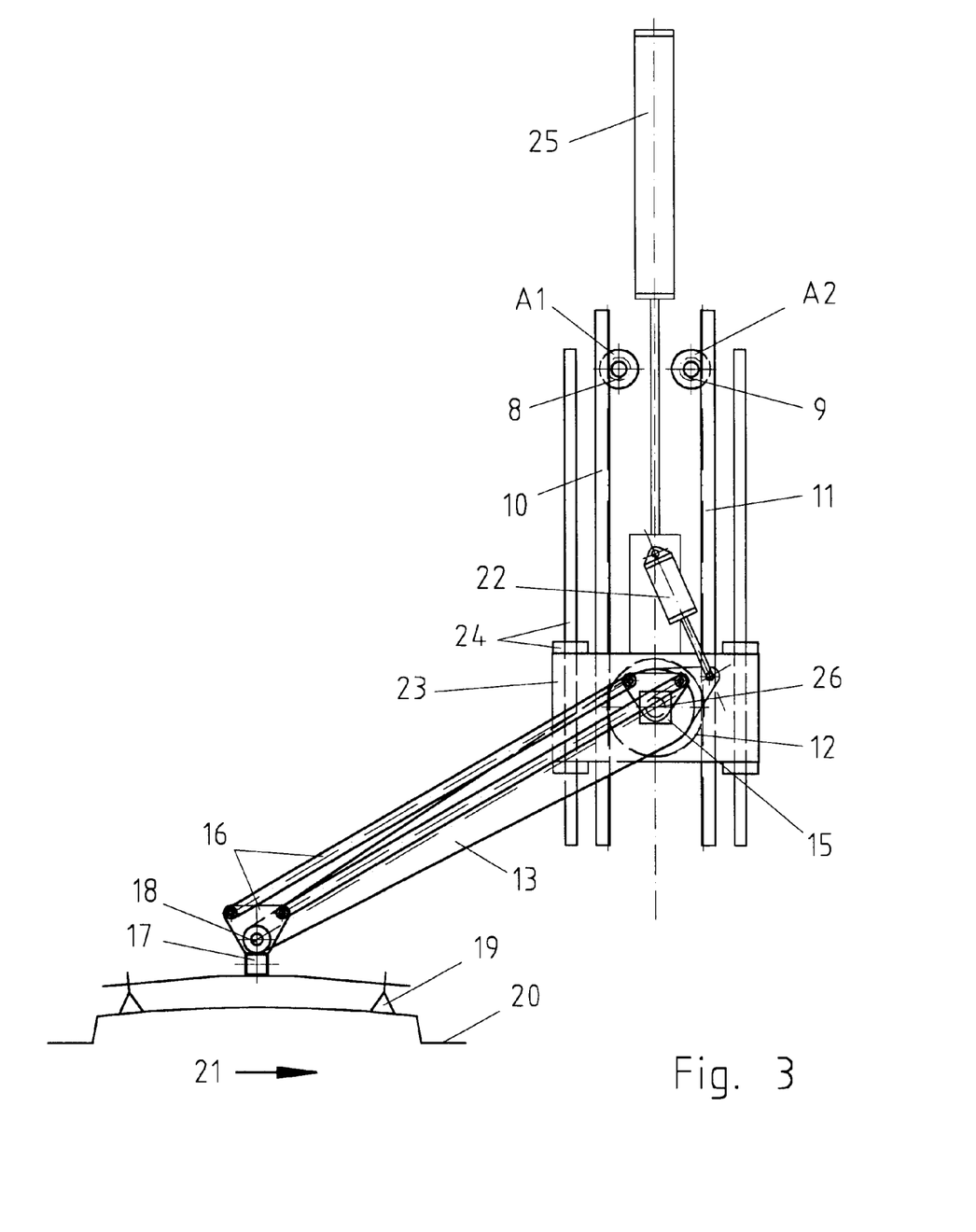
FIG. 3 shows an exemplary embodiment of the transport system

FIG. 3 shows an exemplary embodiment.

The drive train known from FIG. 2 is provided with the same item numbers. As a further drive, a pivoting drive 15 is provided which, via parallelogram linkages 16, can pivot the suction crossmember 17 fixed to the end of the transport arm 13 about the mid-axis 18. This movement is required when the component 20 held by the suction cups 19 is to be given a change in attitude during the transport movement in the press passage direction 21. This change in attitude is used for the purpose of permitting different situations during component removal and component insertion. Instead of a linkage unit, it is of course also possible for other movement transmission means, such as a toothed belt drive, to be used.

In order to reduce the moving masses, the pivoting drive 15 can also be fitted in a stationary manner, for example between the drives A1, A2. The desired movements of the suction crossmember 17 would then be introduced via a rack to a pinion at the center of motion 26. If no additional pivoting of the suction crossmember 17 is envisaged, the pivoting drive 15 can be omitted.

In order to relieve the load on the drive elements, a weight compensation cylinder 22 is provided with the transport arm 13. All the components belonging to the transport arm 13 are jointly mounted on a carriage 23. The carriage 23 is guided and mounted in a linear guidance system 24. In the carriage 23 there is also a mounting (not specifically illustrated) for the racks 10, 11.

By means of the proposed add-on form, it is possible to design the carriage 23 and guide 24 with the desired stiffness and length, without increasing the distance between the shaping stages and therefore the transport step. In order to reduce the drive power of the drives A1, A2 and to relieve the load on the associated gear elements, a weight compensation cylinder 25 which is connected to the carriage 23 can be used.

Figure 4:
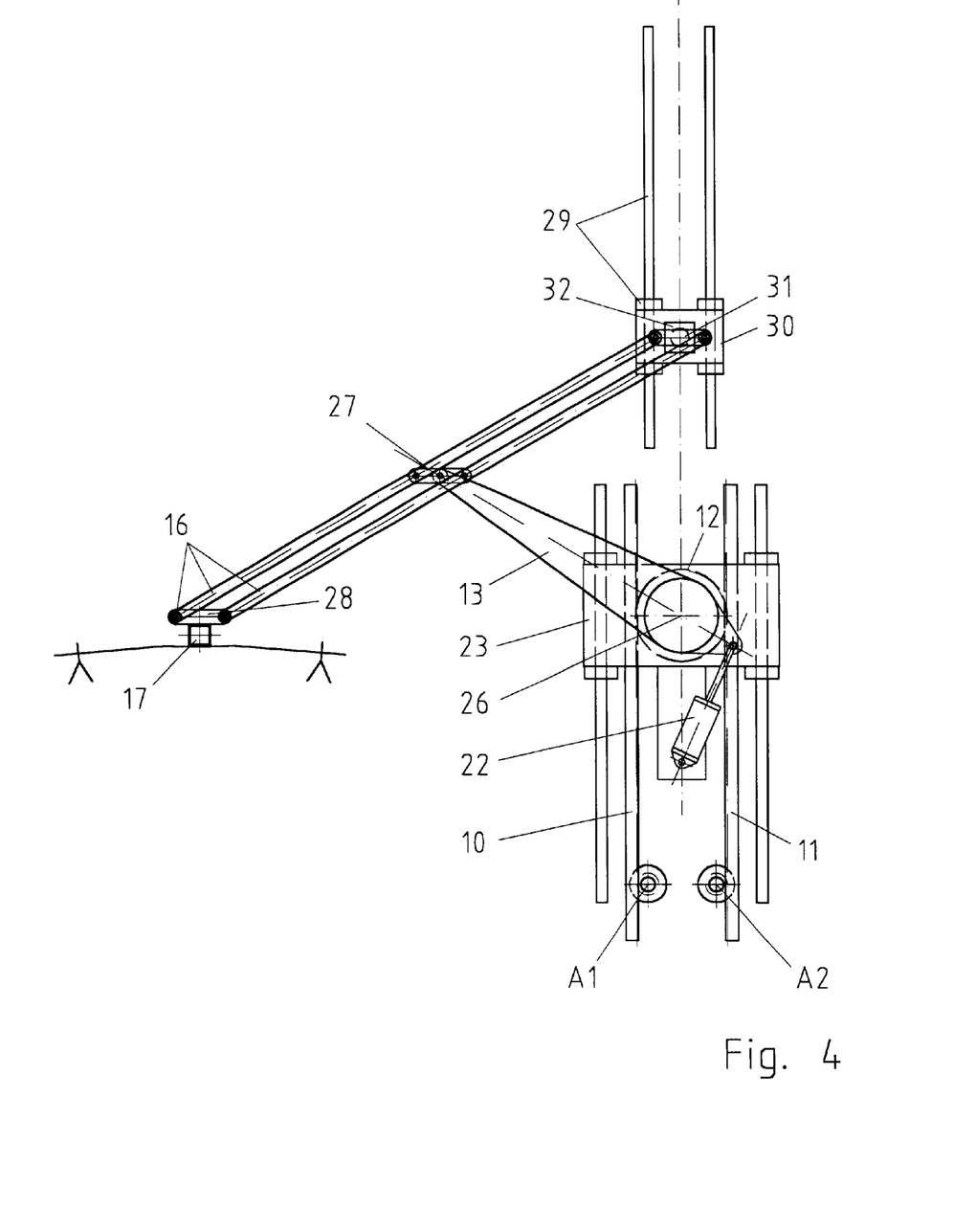
FIG. 4 shows a variant of FIG. 3 with different attachment point

FIG. 4 shows a variant of the representation of the exemplary embodiment described under FIG. 3.

The transport or pivoting arm 13, in particular, has been changed and now, starting from the center of motion 26, acts at the point 27 of the parallelogram 16. The point 27 is preferably located at half the length of the parallelogram linkage 16, and the length 26-27 also corresponds to this half length. As a result of this geometry, the center of point 26 and the center of the parallelogram cross-strut 20 lie on a horizontal line, which also ensures or permits a horizontal travel path. However, as already illustrated in the basic FIG. 2, all desired travel curves in the plane can also be implemented with the drive system. In this arrangement, the reciprocating travel of the carriage 23 corresponds to the lifting stroke of the respective travel curve.

In the example illustrated, the transport arm 13 acts as a pivoting drive on the parallelogram 16 carrying the suction crossmember 17.

In order to achieve the desired degrees of freedom, a further linear guide 29 is provided, in which the carriage executes a vertical movement. The upper part 31 of the parallelogram 16 is attached to the carriage 30. A drive 32 operatively connected to the attachment point 31 can be provided which, by means of a pivoting movement which is transmitted to the suction crossmember 17 via the parallelogram 16, permits the pivoting of components. Instead of the parallelogram 16, a single lever can also be used, and the attitude of the suction crossmember 17 would be controlled accordingly via a pivoting drive in conjunction with a toothed belt drive.

The solution illustrated in FIG. 4 can be implemented with low masses and likewise leads to a beneficial add-on situation, as a result of dividing up the vertical movement for the rack drive and parallelogram. The lever relationships proposed result in travel curves which can be programmed very easily.

Figure 5:
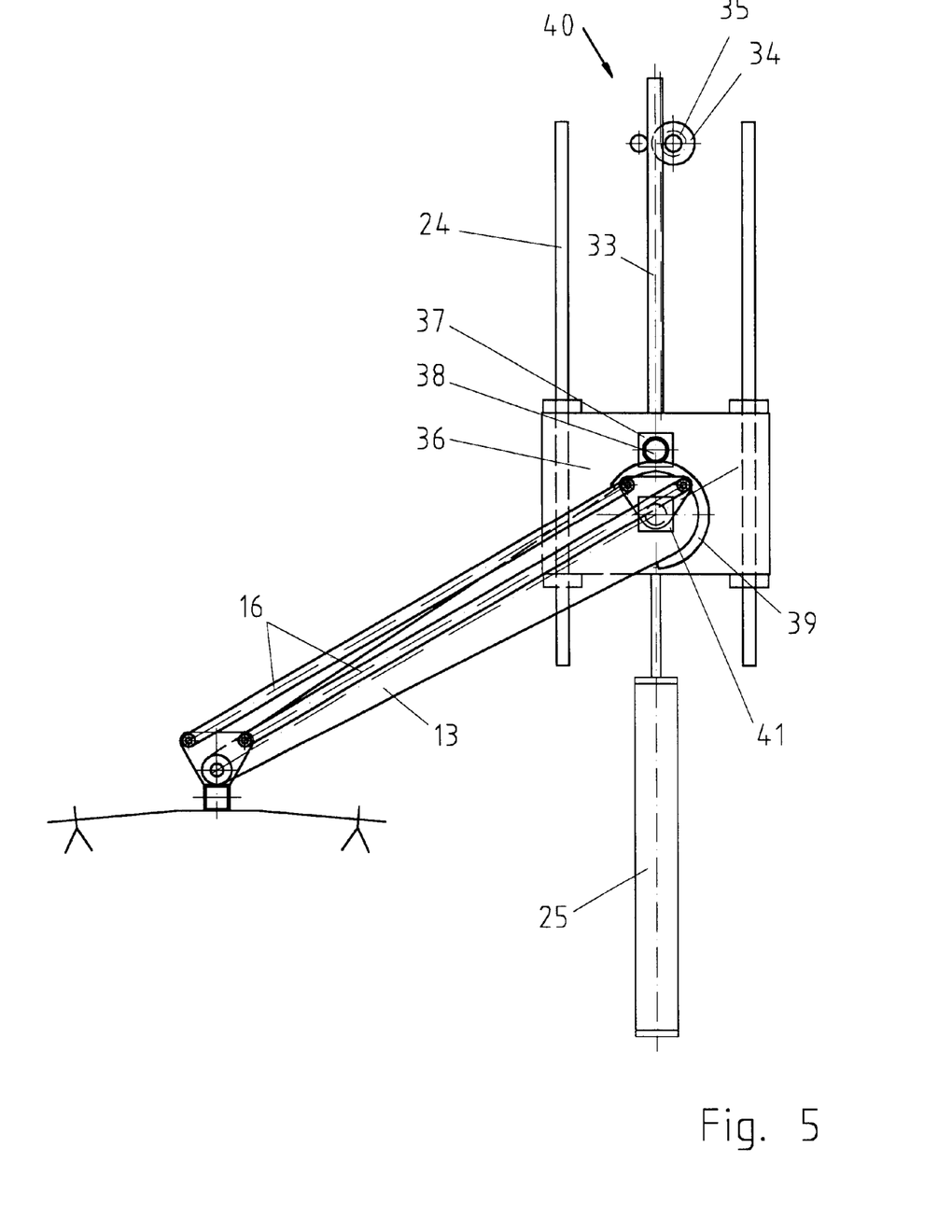
FIG. 5 shows a further exemplary embodiment with a toothed gear mechanism

FIG. 5 shows an exemplary embodiment having a linear drive 40. On this rack 33, a drive 34 adds via a gear 35. The rack 33 is connected to carriage 36 and, in the event of a rotational movement of the drive 34, the carriage 36 executes a vertical movement. Located on the carriage 36 is a pivoting unit comprising a drive 37, pinion 38 and toothed segment 39. The requisite control of linear drive 40 and pivoting drive 37 is carried out on the basis of the desired and programmed travel curve. Additional pivoting of components during the transport step can be carried by means of the pivoting drive 41 by acting on the parallelogram in the manner already explained. In particular, the design of the linear drive is represented only by way of example in FIG. 5 and can be replaced by other commercially available components, such as ball-roller spindles, linear motors and so on.

Figure 6:
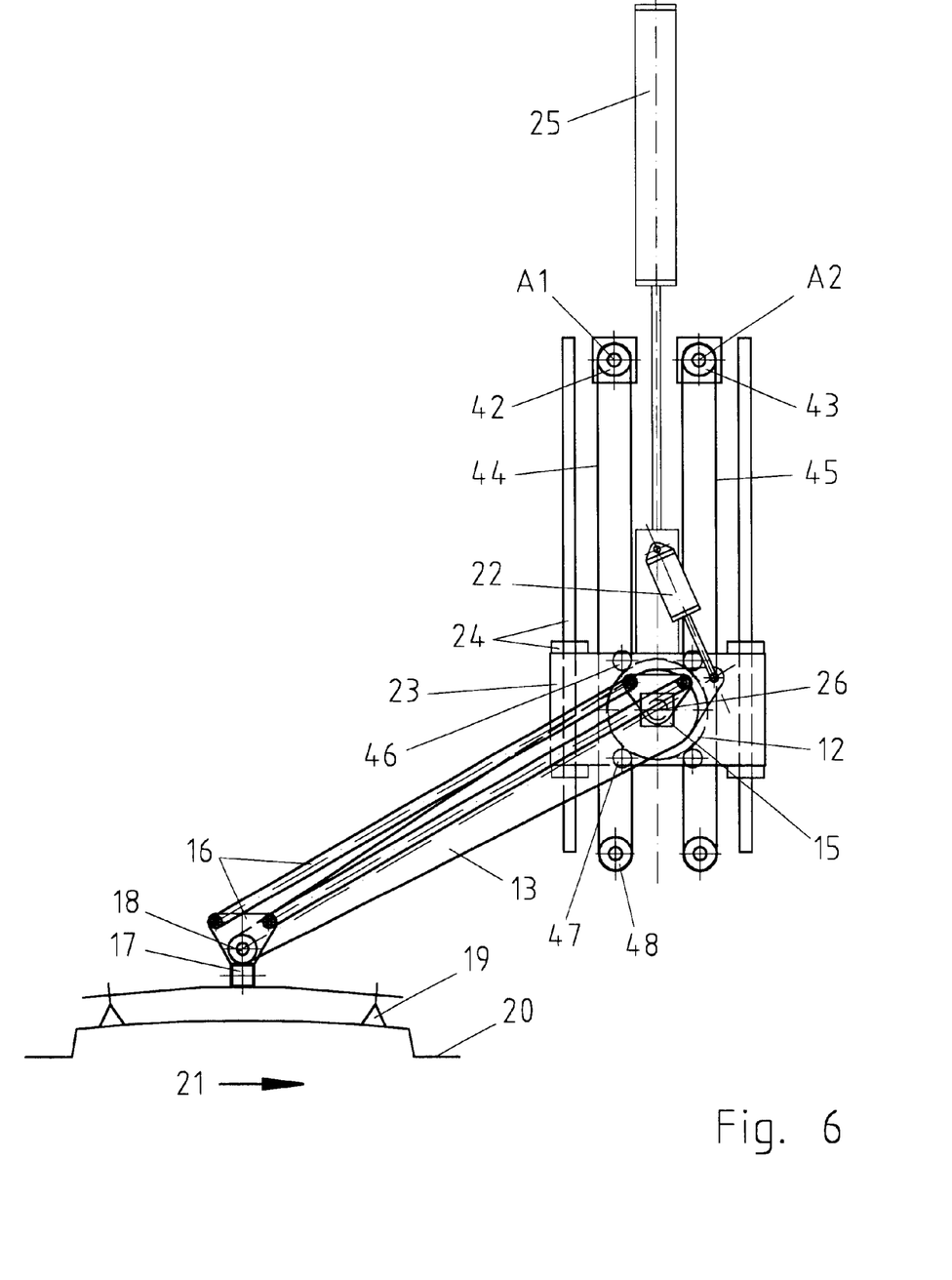
FIG. 6 shows an exemplary embodiment with a toothed-belt drive

Instead of the rack drive, in FIG. 6 the design already mentioned under FIG. 2 is shown with toothed belt drives. Connected to the drives A1, A2 are toothed pulleys 42, 43, which act on toothed belts 44, 45 to transmit movement. The toothed belts 44, 45 bear the tooth profile on both sides, as a result of which the outer tooth profile then acts on gear 12. The complete toothed belt drive then further comprises the deflection and guide toothed pulleys 46, 47 and 48.

The movement sequence achieved by the drives A1, A2 operatively connected by the toothed belt drive to the transport arm 13 is completely identical to that illustrated, in particular, under FIG. 2.

Figure 7:
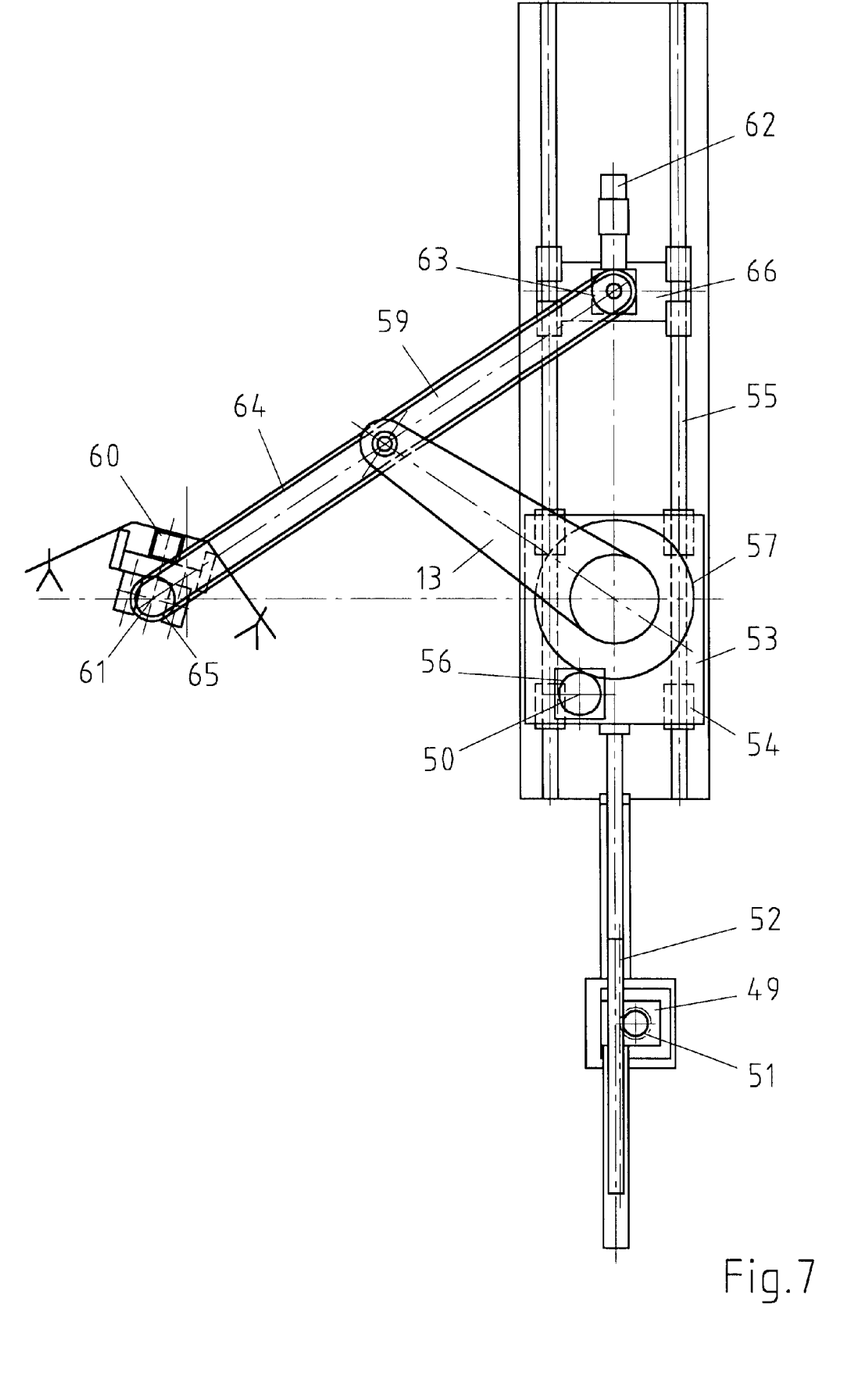
FIG. 7 shows a variant of FIG. 5.

A further design variant is proposed in FIG. 7. In order to achieve the desired travel curves, a lifting drive 49 and a pivoting drive 50 are provided in a common superimposed-movement function or as an individually driven movement. In a beneficial arrangement, the lever drive 49 is fitted in a stationary manner, for example on the press upright, which reduces the masses to be accelerated. For example, the lever drive 49 acts on a rack 52 via a pinion 51. The translational movement is transmitted by the rack 52 to a carriage 53. Carriage 53 is mounted via guide elements 54 in the guide 55 such that it can be displaced vertically.

Pivoting drive 50 is fixed to carriage 53 and drives the pivoting lever 13 via pinion 56 and gear 57. The pivoting lever 13 is attached to the drive lever 59 in a similar way to that in FIG. 4, and the preferred geometric and kinematic relationships described in FIG. 4 also apply.

The holder for the actual workpiece clamping system, for example suction beam or gripper, is designated by 60. Should a change in the attitude of the workpiece be required, because of different removal and insertion positions, the holder 60 could be pivoted about the pivot 61. The ability to pivot is controlled via the drive 62 which, operatively connected to belt pulley 63 and toothed belt 64, drives the belt pulley 65 connected to the pivot axis. The carriage 66, which can be moved vertically in guides 55, is used to mount the drive lever 59 and the drive 62.

The invention is not restricted to the exemplary embodiment described and illustrated. It also comprises all configurations by persons skilled in the art within the scope of the applicable claim 1.

Also possible is the use of connecting shafts, starting from the respective drive pivots, transverse with respect to the component transport direction, in order to couple two transport systems to each other mechanically for the purpose of synchronization and/or the possibility of reducing the number of drives.

The embodiments illustrated and discussed in this specification are intended only to teach those skilled in the art the best way known to the inventors to make and use the invention. Nothing in this specification should be considered as limiting the scope of the present invention. All examples presented are representative and non-limiting. The above-described embodiments of the invention may be modified or varied, without departing from the invention, as appreciated be those skilled in the art in light of the above teachings. It is therefore to be understood that, within the scope of the claims and their equivalents, the invention may be practiced otherwise than as specifically described.

What is claimed is:

1. A transporting device for transporting workpieces in a press, the transporting device comprising:
 a pivoting or transport arm adapted for engaging a workpiece;
 a load-bearing carriage for carrying the pivoting or transport arm, the load-bearing carriage being movable in a longitudinal direction;
 a drive gear for rotating the pivoting or transporting arm;
 two racks arranged in parallel for acting jointly on the drive gear; and
 at least two stationary drive motors for driving the two racks, respectively, the drive motors being controllable in direction of rotation, speed of rotation, and stopping for affecting a coordinated movement of the two racks for setting the longitudinal movement of the load-bearing carriage and the rotating of the pivoting or transport arm.

2. The device as claimed in claim 1, further including linear guides arranged for mounting the carriage on the press and one of a parallelogram linkage arm and a drive lever operatively connected with the carriage.

3. The device as claimed in claim 1, wherein the pivoting or transport arm includes a parallelogram linkage that has a pivotable suction crossmember for holding one of the workpieces.

4. The device as claimed in claim 1, further including
 a vertical linear guide,
 a parallelogram linkage arm having an arm length and first and second ends, the second end being opposite the first end,
 a guide carriage for connecting to the parallelogram linkage arm at the first end, and
 a suction crossmember for connecting to the second end,
 wherein the pivoting or transport arm has a pivoting or transport arm length that is about half of the linkage arm length.

5. The device as claimed in claim 2, further including a suction crossmember for engaging the workpiece and an adjusting drive coupled to the one of parallelogram linkage arm and drive lever for pivoting the suction crossmember.

6. The device as claimed in claim 1, further comprising:
 a weight compensation cylinder coupled to the carriage for supporting the longitudinal movement of the load-bearing carriage.

7. The device as claimed in claim 1, further comprising:
 a weight compensation cylinder coupled to the carriage for supporting at least one of the longitudinal movement of the load-bearing carriage and an adjustment movement of the parallelogram linkage arm.

8. The device as claimed in claim 1, further including a separate pivoting drive coupled to the transport arm, wherein the longitudinal movement of the load-bearing carriage is carried out by the two racks and the drive gear, and the rotating movement of the pivoting or transport arm is carried out by the separate pivoting drive.

9. A transporting device for transporting workpieces in a press, the transporting device comprising:
 a pivoting or transport arm adapted for engaging a workpiece;
 a load-bearing carriage for carrying the pivoting or transport arm, the load-bearing carriage being movable in a longitudinal direction;
 a drive gear for rotating the pivoting or transporting arm;
 two toothed belt drives arranged in parallel for acting jointly on the drive gear; and
 at least two stationary drive motors for driving the two toothed belt drives, respectively, the drive motors being controllable in direction of rotation, speed of rotation, and stopping for affecting a coordinated movement of the two toothed belt drives for setting the longitudinal movement of the load-bearing carriage and the rotating of the pivoting or transport arm.

10. The device as claimed in claim 9, further including linear guides arranged for mounting the carriage on the press and one of a parallelogram linkage arm and a drive lever operatively connected with the carriage.

11. The device as claimed in claim 9, wherein the pivoting or transport arm includes a parallelogram linkage that has a pivotable suction crossmember for holding one of the workpieces.

12. The device as claimed in claim 9, further including
 a vertical linear guide,
 a parallelogram linkage arm having an arm length and first and second ends, the second end being opposite the first end,
 a guide carriage for connecting to the parallelogram linkage arm at the first end, and
 a suction crossmember for connecting to the second end,
 wherein the pivoting or transport arm has a pivoting or transport arm length that is about half of the linkage arm length.

13. The device as claimed in claim 10, further including a suction crossmember for engaging the workpiece and an adjusting drive coupled to the one of parallelogram linkage arm and drive lever for pivoting the suction crossmember.

14. The device as claimed in claim 9, further comprising:
 a weight compensation cylinder coupled to the carriage for supporting the longitudinal movement of the load-bearing carriage.

15. The device as claimed in claim 9, further comprising:
 a weight compensation cylinder coupled to the carriage for supporting at least one of the longitudinal movement of the load-bearing carriage and an adjustment movement of the parallelogram linkage arm.

16. The device as claimed in claim 9, further including a separate pivoting drive coupled to the transport arm, wherein the longitudinal movement of the load-bearing carriage is carried out by the two toothed belt drives and the drive gear, and the rotating movement of the pivoting or transport arm is carried out by the separate pivoting drive.

* * * * *